(12) United States Patent
Russell et al.

(10) Patent No.: US 7,552,216 B2
(45) Date of Patent: Jun. 23, 2009

(54) METHOD OF SHARING A PRINTER

(75) Inventors: Richard Francis Russell, Lexington, KY (US); Lawrence Russell Steward, Lexington, KY (US); Michael Ray Timperman, Versailles, KY (US); Jason Eric Waldeck, Lexington, KY (US); Charles Thomas Wolfe, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1703 days.

(21) Appl. No.: 09/818,179

(22) Filed: Mar. 27, 2001

(65) Prior Publication Data

US 2002/0142720 A1  Oct. 3, 2002

(51) Int. Cl.
*G06F 15/173* (2006.01)
(52) U.S. Cl. .............. 709/226; 709/203; 709/220; 709/221; 709/222; 709/223; 709/224; 709/225
(58) Field of Classification Search ............ 709/230, 709/232, 236, 201–203, 223–225
See application file for complete search history.

(56) References Cited

U.S. PATENT DOCUMENTS

| | | | |
|---|---|---|---|
| 5,323,393 A | 6/1994 | Barrett et al. | |
| 5,438,528 A | 8/1995 | Emerson et al. | |
| 5,530,862 A | 6/1996 | Wadsworth et al. | |
| 5,537,550 A * | 7/1996 | Russell et al. | 709/224 |
| 5,537,626 A | 7/1996 | Kraslavsky et al. | |
| 5,548,728 A | 8/1996 | Danknick | |
| 5,550,957 A | 8/1996 | Davidson, Jr. et al. | |
| 5,550,997 A | 8/1996 | Ip et al. | |
| 5,568,612 A | 10/1996 | Barrett et al. | |
| 5,606,671 A | 2/1997 | Wadsworth et al. | |
| 5,611,046 A | 3/1997 | Russell et al. | |
| 5,613,160 A | 3/1997 | Kraslavsky et al. | |
| 5,623,604 A | 4/1997 | Russell et al. | |
| 5,633,992 A * | 5/1997 | Gyllenskog | 358/1.15 |
| 5,636,333 A | 6/1997 | Davidson, Jr. et al. | |
| 5,647,056 A | 7/1997 | Barrett et al. | |
| 5,651,114 A | 7/1997 | Davidson, Jr. | |
| 5,657,448 A | 8/1997 | Wadsworth et al. | |
| 5,696,899 A | 12/1997 | Kalwitz | |
| 5,699,493 A | 12/1997 | Davidson, Jr. et al. | |
| 5,701,411 A | 12/1997 | Tran et al. | |
| 5,710,908 A | 1/1998 | Man | |
| 5,720,015 A | 2/1998 | Martin et al. | |
| 5,724,555 A | 3/1998 | Wadsworth | |
| 5,727,135 A | 3/1998 | Webb et al. | |
| 5,727,220 A * | 3/1998 | Hohensee et al. | 715/234 |
| 5,732,198 A | 3/1998 | Deppa et al. | |
| 5,768,483 A | 6/1998 | Maniwa et al. | |
| 5,784,622 A | 7/1998 | Kalwitz et al. | |
| 5,815,722 A | 9/1998 | Kalwitz et al. | |
| 5,819,015 A | 10/1998 | Martin et al. | |

(Continued)

*Primary Examiner*—Dohm Chankong
(74) *Attorney, Agent, or Firm*—Taylor & Aust, PC

(57) ABSTRACT

A method of sharing a printer between a plurality of users on a computer network includes attaching host-based networking hardware to the printer. A network communication protocol defines a command channel and a data channel. Only one of the users is allowed to own the data channel at any single point in time. The host-based networking hardware is instructed to accept information on the data channel only from the user that owns the data channel.

12 Claims, 3 Drawing Sheets

U.S. PATENT DOCUMENTS

| | | | |
|---|---|---|---|
| 5,841,991 A | 11/1998 | Russell | |
| 5,862,404 A * | 1/1999 | Onaga | 709/223 |
| 5,873,659 A | 2/1999 | Edwards et al. | |
| 5,905,906 A | 5/1999 | Goffinet et al. | |
| 5,960,167 A | 9/1999 | Roberts et al. | |
| 5,982,994 A | 11/1999 | Mori et al. | |
| 6,003,078 A * | 12/1999 | Kodimer et al. | 709/224 |
| 6,023,727 A | 2/2000 | Barrett et al. | |
| 6,025,925 A | 2/2000 | Davidson, Jr. et al. | |
| 6,029,198 A | 2/2000 | Iizuka | |
| 6,047,319 A * | 4/2000 | Olson | 709/223 |
| 6,091,507 A * | 7/2000 | Vatland et al. | 358/1.15 |
| 6,202,096 B1 * | 3/2001 | Williams et al. | 709/230 |
| 6,321,258 B1 * | 11/2001 | Stollfus et al. | 709/230 |
| 6,348,973 B1 * | 2/2002 | Vatland et al. | 358/1.15 |
| 6,370,592 B1 * | 4/2002 | Kumpf | 709/231 |
| 6,384,926 B2 * | 5/2002 | Mochizuki | 358/1.15 |
| 6,490,052 B1 * | 12/2002 | Yanagidaira | 709/203 |
| 6,785,727 B1 * | 8/2004 | Yamazaki | 709/229 |

* cited by examiner

METHOD OF SHARING A PRINTER

BACKGROUND OF THE INVENTION

1. Field of the Invention

The present invention relates to a method of sharing a printer, and, more particularly, to a method of sharing a printer on a computer network.

2. Description of the Related Art.

It is known for a printer to be controlled by a host computer on a computer network. The essential purpose of all networks is to provide a common media for the orderly exchange of data between cooperating nodes. This host-based paradigm separates the image processing (fonts, images, etc.) from the physical printing mechanism such that the intensive raster image processing is performed on the host computer, leaving the printer's processor free to perform the task of physically placing the pixels on the media. The processing power required to physically place the pixels is significantly smaller than that required of printers that also interpret data streams. Thus, printers that do not have to interpret data streams have a lower cost.

Adding traditional protocol-based networking to a host based printer is cost prohibitive because the cost of the network electronics approaches or exceeds the cost of the complete printer electronics.

What is needed in the art is a low cost method of extending the host-based printing paradigm to host-based networking.

SUMMARY OF THE INVENTION

The present invention provides a transport protocol that can be easily implemented in hardware and that can co-exist with standard network protocols.

The present invention comprises, in one form thereof, a method of sharing a printer between a plurality of users on a computer network. Host-based networking hardware is attached to the printer. A network communication protocol defines a command channel and a data channel. Only one of the users is allowed to own the data channel at any single point in time. The host-based networking hardware will only accept information on the data channel only from the user that owns the data channel, in turn passing this data to the printer.

The present invention enables the use of conventional networking infrastructure to physically connect host-based printers to workstations. A data channel is reserved for exclusive use by the host-based driver. A command channel responds to certain signals but replies with an all-inclusive set of field values indicating the present state of the device. A "set of rules" allows at least one workstation with a host-based network print driver to deliver print data to a host-based network printer using the shared network medium.

Standard networking protocols require a substantial amount of overhead (and cost) to maintain many concurrent connections between many clients and many servers. The present invention, in contrast, disallows any concurrent data connections, i.e., allows only one data connection to exist at a time, shifts the burden of sharing to the host, and only allows the host-based networking application to connect to the host-based networking printer. Thus, the present invention provides a low cost, high speed data transport mechanism that fits the host-based printing paradigm.

An advantage of the present invention is that the need for a protocol-processing engine, such as a central processing unit (CPU), is eliminated, thereby significantly reducing the cost of the printer.

Another advantage is that the functionality of the printing system is not reduced, since the "protocol-processing" function can be implemented in host software.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
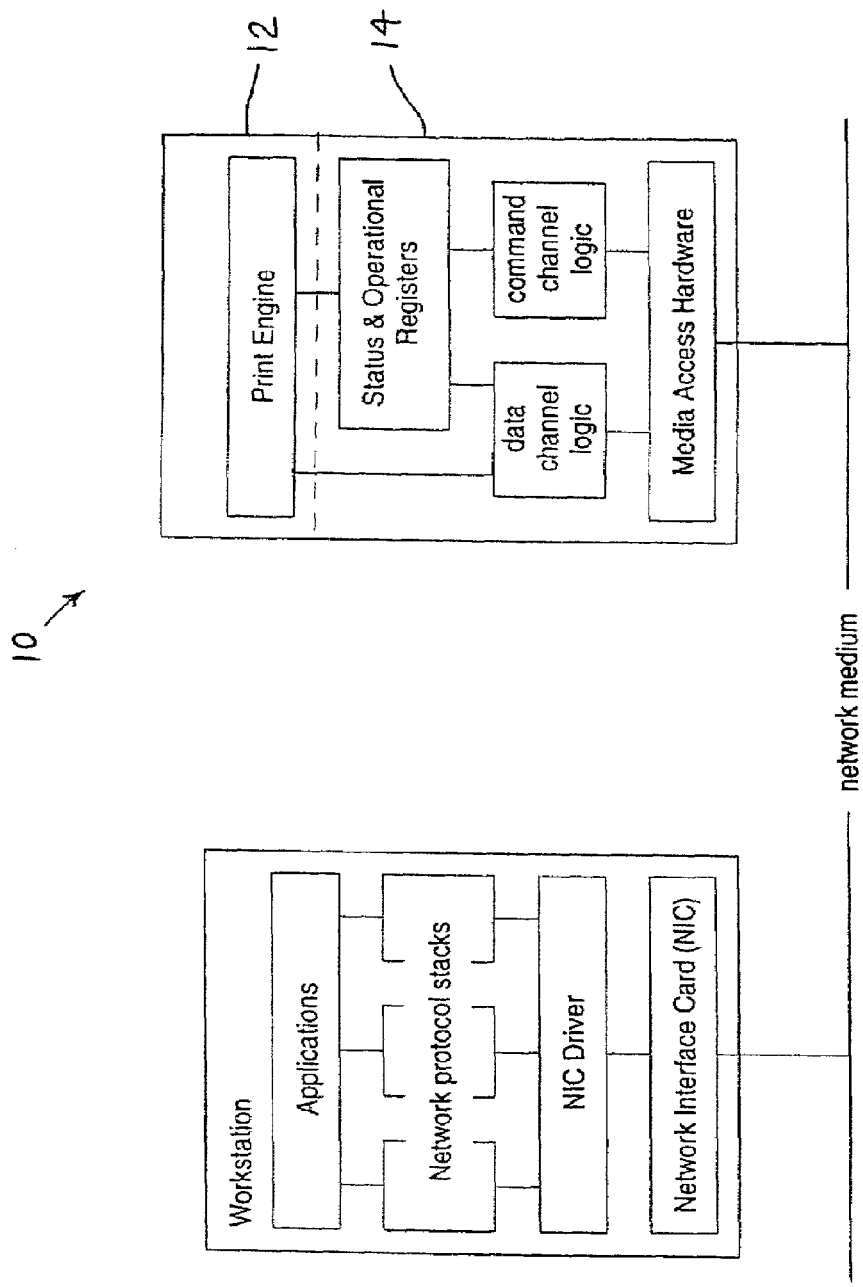
FIG. 1 is a block diagram of one embodiment of a computer network which may be used in conjunction with the method of the present invention.

Referring now to the drawings, and particularly to FIG. 1, there is shown a segment of a network employing host-based networking. One node, a workstation, is attached to the network medium. A second node, a host-based networking printer 10, is likewise connected to the same network. Printer 10 includes a host-based printer 12 and host-based networking hardware 14. Though not shown, many other nodes may be connected and operate simultaneously on this network oblivious to these two devices.

To facilitate printing, the print driver, i.e., the application, must be able to create host-based networking printer specific data and deliver it in order and unaltered to the host-based networking printer. Workstation host-based networking print drivers are designed to cooperate in order to facilitate the "fair-sharing" of the host-based networking printer amongst a number of workstations. To exist concurrently with other networking appliances, a common standard for transporting data on the medium must be adhered to by all devices. For example, DIX or IEEE 802.3 defines the standard for Ethernet. In adhering to the standard, each device must have a universally unique address (IEEE assigns these for Ethernet and token ring). Further adherence dictates that the host-based networking appliances will use these addresses to exchange basic units of data (frames). Within the frame, these addresses are used by the networking hardware to deliver the frame much like the address and return address fields on a piece of postage are used to deliver the piece of postage.

A communication frame (FIG. 2) can be described as a sequential collection of bytes that conform to the agreed definition of the basic transport mechanism of the network medium. By using these frames, informational units can be exchanged between the workstation and the host-based networking printer, as illustrated in FIG. 3, regardless of any other frames that are being sent between other nodes.

Figure 2:
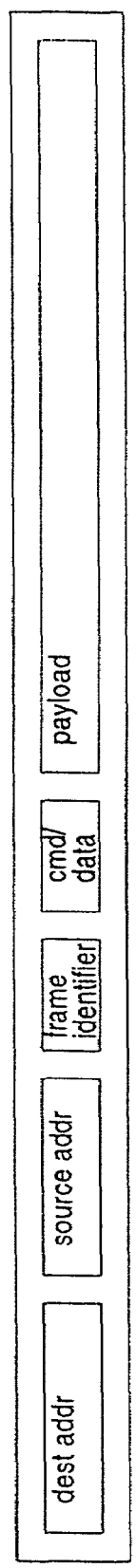
FIG. 2 is a diagram of one embodiment of a communication frame that can be used in the method of the present invention.
Figure 3:
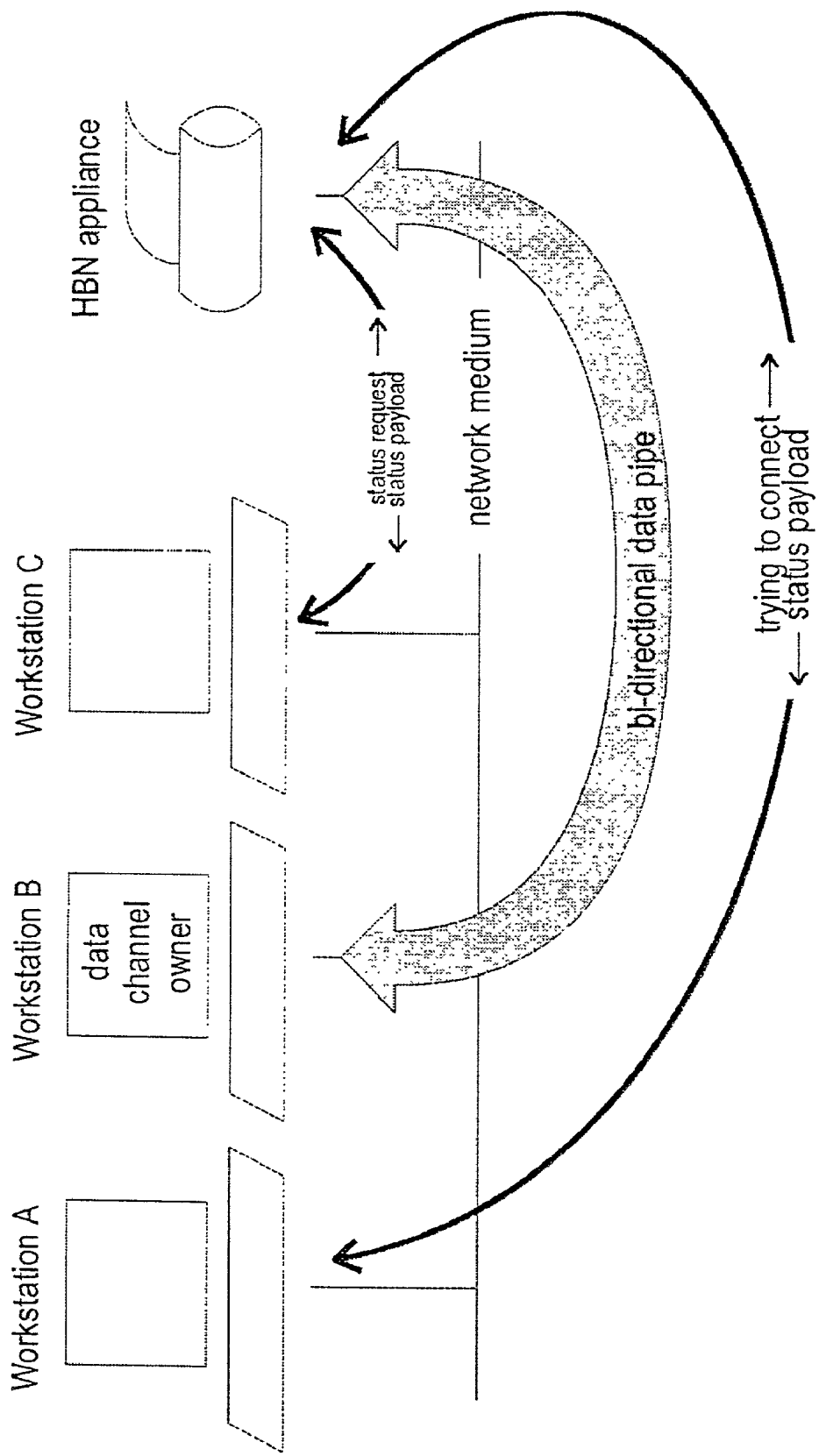
FIG. 3 is another block diagram of the computer network of FIG. 1.

The conceptual frame shown in FIG. 2 depicts a field labeled "cmd/dat". The value in this field specifies either the command channel or the data channel for each frame.

The data channel is used to send print objects from the workstation host-based printing driver to the printer using the "payload" field in the frame. To minimize complexity and thus minimize cost, only one workstation is allowed to "own" the data channel at any given point in time. Any traffic received on the data channel that does not originate from the "owner" is immediately discarded by the hardware.

The command channel is used to signal the host-based networking hardware. Any host-based networking appliance can send a signal to the host-based networking hardware. Various signals can be defined. In this embodiment, the signals "connect", "close", "terminate" and "status" are defined. "Connect" is a request to acquire the data channel with a desire to send data. "Close" is a request to release the data channel. "Terminate" is a request to release the data channel and abort the print job. Only a host-based network appliance that is the owner of the data channel can send a "close" command. "Status" is a request for printer status with no desire to send data.

The host-based networking hardware 14 will respond to any signal received on the command channel by transmitting a frame whose payload a fixed structure dynamically populated using the hardware's status and operational registers to the originator of the signal. This fixed structure is the STATUS response. When designing the target system the STATUS response must include the owner of the data channel. Other informational items may also be of use such as: ink levels, paper tray levels, head alignment settings, etc.

The interaction of the commands and the STATUS response are specified by data channel logic, command channel logic, and host rules.

According to the data channel logic, the printer waits for a data channel connection. The printer then waits for a frame. If the sender of the frame is not the data channel owner, then the frame is discarded. If the sender of the frame is the data channel owner, then the frame is processed by host-based networking hardware 14.

If the sequence number is correct, the data content of the frame is sent to the print engine, and an acknowledgement signal is sent to the host. If the sequence number is incorrect, the frame is discarded, and an acknowledgement signal is sent to the host indicating the frame number of the last successfully received frame.

If a terminate signal is received on the command channel, the data channel is released and the printer again waits for a data channel connection. If a timeout occurs while the printer waits for a frame, i.e., a communication frame has not been received within a predetermined time period, then an acknowledgement signal is sent to the host indicating the last successfully received frame. If three timeouts occur in succession, the print engine is signaled to abort the print job, the data channel is released, and the print again waits for a data channel connection.

According to the command channel logic, the host-based networking hardware waits for a command signal to do something. If the command is a connect signal, then the printer checks for data channel ownership. If the data channel is not in use, then the sender of the connect signal is recorded as the owner of the data channel and the STATUS response containing the new owner is transmitted to the sender. If, on the other hand, the data channel already has an owner, then the STATUS response containing the current owner is sent to the sender of the connect signal.

If the command is the status signal, then the printer sends the STATUS response to the sender of the status signal. If the command is the close signal, and the source of the close signal is the data channel owner, then the data channel is freed, and the STATUS response is sent to the sender of the close signal. If the command is the terminate signal, then the print engine is signaled to abort the job, the data channel is freed, and the STATUS response is sent to the sender.

According to the host rules, on the command channel, a status signal can be sent at any time to fetch the STATUS response. A connect signal can be sent at any time to indicate desire to use the data channel. A STATUS response indicates who is the current owner of the data channel. If the owner of the data channel is the same as the sender of the connect signal, then the data channel has been successfully acquired.

A close signal will only be recognized by host-based networking hardware 14 if the sender is the data channel owner. The close signal provides for the orderly release of the data channel by the owner. The STATUS response indicates whether the data channel has been successfully released.

The terminate signal will only be recognized by host-based networking hardware 14 if the sender is the data channel owner. The terminate signal is similar to a close command, but additionally provides an indication to the printer to abort printing as soon as possible. The STATUS response indicates that the data channel has been successfully released.

On the data channel, only frames from the data channel owner are processed by the host-based networking hardware. All other frames are discarded with no response. All frames from the data channel owner are acknowledged to the sender of the frame. The acknowledgement includes the frame number.

The host-based networking hardware can selectively process certain frames of data that have been transmitted in a layered protocol without the host-based networking hardware having either UDP (User Dataframe Protocol)/IP or Ethernet processing engines. UDP/IP, an example of such a layered protocol, is encapsulated in internetwork protocol that is encapsulated in an Ethernet frame. More particularly, a workstation can transmit a data frame into the network such that an initial portion of the data frame includes a unique, identifying data sequence that indicates the data in the next portion of the data frame is in a format that can be recognized as print data and passed on to printer 12 by host-based networking hardware 14. The media access hardware or other hardware within host-based networking hardware 14 can receive the initial portion of the data frame and determine whether it includes the unique, identifying data sequence. If so, host-based networking hardware 14 reads, processes and sends the next portion of the data frame to printer 12. If not, host-based networking hardware 14 ignores the next portion of the data frame and discards the data frame without performing any further processing.

Host-based networking hardware 14 can read the first portion of the data frame and determine in real time whether it includes the predetermined data sequence without having to store any of the data frame in any type of memory. Since host-based networking hardware 14 only processes Ethernet data frames identified as having a specific, unique format that is ready for printing, host-based networking hardware 14 does not need a protocol-processing engine to further process the data frame, as does a conventional network appliance that can interpret various types of Ethernet protocols.

If a frame from the data channel owner does not have the expected sequence number, the frame is discarded. The acknowledgment includes the frame number of the last successfully received frame.

While the present invention may use Ethernet as the shared media, it is to be understood that other forms of shared network media may be used as well.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of sharing a printer between a plurality of users on a computer network, said method comprising the steps of:
    attaching host-based networking hardware to the printer;
    providing a network communication protocol defining a command channel and a data channel;
    allowing only one of the users to own the data channel at any single point in time on a fair-sharing first come first serve basis; and
    instructing the host-based networking hardware to accept information on the data channel only from the user that owns the data channel,
    wherein the network communication protocol defines a communication frame having at least one of a destination address field, a source address field, a frame identifier field, a command/data definition field, and a payload field;
    sending the communication frame from the user that owns the data channel to the host-based networking hardware;
    wherein the communication frame has a frame number and a sequence number, the host-based networking hardware discarding any said communication frame that does not have an expected said sequence number, and
    wherein, in response to receiving said communication frame that does not have said expected sequence number, the host-based networking hardware sends an acknowledgement including the frame number of a last successfully received communication frame to the user that owns the data channel.

2. The method of claim 1, wherein the host-based networking hardware disregards all said information received on the data channel from any of the users that do not own the data channel.

3. The method of claim 1, wherein the host-based networking hardware responds to a command on the command channel from any of the users.

4. The method of claim 3, wherein the host-based networking hardware responds with a status response.

5. The method of claim 4, wherein the status response indicates the user that owns the data channel.

6. The method of claim 1, wherein the user that owns the data channel can release the data channel by sending one of a close signal and a terminate signal on the command channel to the host-based networking hardware.

7. The method of claim 6, wherein a print job is aborted in response to the terminate signal.

8. The method of claim 6, wherein a user that does not own the data channel can acquire the data channel by sending a connect signal on the command channel to the host-based networking hardware.

9. The method of claim 1, wherein the host-based networking hardware sends an acknowledgement of receiving the communication frame to the user that owns the data channel.

10. The method of claim 1, wherein a timeout occurs when the host-based networking hardware does not receive said communication frame within a predetermined time period.

11. The method of claim 10, wherein the host-based networking hardware aborts a print job after a third said timeout.

12. The method of claim 11, wherein the host-based networking hardware releases the data channel after the print job is aborted.

* * * * *